United States Patent [19]

Rausing et al.

[11] 4,379,014
[45] Apr. 5, 1983

[54] METHOD OF MANUFACTURE OF PACKING CONTAINERS AND PACKING CONTAINERS MANUFACTURED IN ACCORDANCE WITH THE METHOD

[75] Inventors: Anders R. Rausing, Lausanne; E. Ingvar Nilsson, Åkarp, both of Switzerland

[73] Assignee: Tetra Pak Developpement SA, Pully-Lausanne, Switzerland

[21] Appl. No.: 197,074

[22] Filed: Oct. 15, 1980

[30] Foreign Application Priority Data

Oct. 22, 1979 [CH] Switzerland .......................... 9466/79

[51] Int. Cl.³ ............................................. B31C 81/00
[52] U.S. Cl. .................................... 156/191; 156/229; 229/4.5; 428/480
[58] Field of Search ....................... 156/195, 229, 191; 229/4.5; 428/480

[56] References Cited

U.S. PATENT DOCUMENTS 3,312,250  4/1967  Sirignano et al. .................... 156/195
3,452,506  7/1969  Broerman ........................... 156/195
4,091,150  5/1978  Roelofs ................................. 428/57

FOREIGN PATENT DOCUMENTS 51-20231  6/1976  Japan .................................. 156/195

Primary Examiner—George F. Lesmes
Assistant Examiner—B. K. Johnson
Attorney, Agent, or Firm—Burns, Doane, Swecker & Mathis

[57] ABSTRACT

The invention relates to a method for the manufacture of packing containers. The container body of the packing container is manufactured by spiral winding of a monoaxially molecular-oriented polyester film. The polyester film is spirally wound onto a mandrel to form a tube with the edge zones of successive turns of the strip overlapping in a continuous joint. The material is sealed within the edge zones by means of surface fusion. The invention also relates to a packing container manufactured in accordance with the method.

9 Claims, 4 Drawing Figures

METHOD OF MANUFACTURE OF PACKING CONTAINERS AND PACKING CONTAINERS MANUFACTURED IN ACCORDANCE WITH THE METHOD

BACKGROUND AND SUMMARY OF THE PRESENT INVENTION

The present invention relates to a method for the manufacture of packing containers and a packing container manufactured in accordance with the method.

It is known in packaging technology that container bodies can be made by winding one or more strips of a plane material onto a mandrel, the strips being joined to one another by glueing or sealing. It is an advantage of this method that a continuous tube can be made, which tube can then be cut up to container bodies.

It is also known that oriented plastic material, and here in particular oriented polyester material, can be used in packing containers for pressurized contents, since oriented polyester material has a very great tensile strength and little deformation in the direction of orientation. Up to now oriented polyester material has occurred exclusively in the manufacture of bottle-type containers, the material being orientation-stretched in connection with the manufacture of the bottle by blowing. It has been found that such bottles of oriented polyester material can withstand internal pressures of up to 7–10 kg.

Since blowing of bottles is a relatively expensive and slow method for the manufacture of packing containers there is a need for manufacturing containers having the ability of absorbing great internal pressure without being deformed to an appreciable degree by a faster and more economic method. The present invention provides a method for the manufacture of such a container.

BRIEF DESCRIPTION OF THE DRAWING

In the following the invention will be described with reference to the enclosed diagrammatic drawing, wherein like members bear like reference numerals and wherein.

DETAILED DESCRIPTION OF THE PREFERRED EMBODIMENT

In the design of cylindrical vessels or containers intended to be subjected to an internal pressure it is known that the stresses in longitudinal direction of the cylindrical part are only half as great as the stresses in transverse direction. A material-economical dimensioning of the container body would mean therefore that the container body should have twice the tensile strength in the transverse direction as in the longitudinal direction.

As mentioned earlier, it is known that oriented polyester film has a very high tensile strength in the direction of orientation. Since it is relatively simple to manufacture monoaxially oriented polyester strip, where the direction of orientation coincides with the longitudinal direction of the strip, such an oriented polyester strip can be used with advantage in the manufacture of the container body for a container intended to be subjected to internal pressure. The tensile strength of the polyester strip, and hence its deformation under stress, is appreciably less in the direction of orientation than in transverse direction. Accordingly, it is possible through the choice of a suitable winding angle during the winding of the strip onto the mandrel to obtain such a pitch and location of the strip that its tensile stress properties are substantially utilized for taking up the tangential stresses in the spirally wound container body. This means that the strip must be wound at a relatively small pitch angle, which in turn implies that the strip is relatively narrow. The width of strip may be related to the diameter of the sleeve formed. In order to obtain an appropriate ratio of tensile strength in the transverse direction and longitudinal direction of the sleeve the width of the strip must be between 75 and 150% of the diameter of the finished sleeve.

Figure 1:
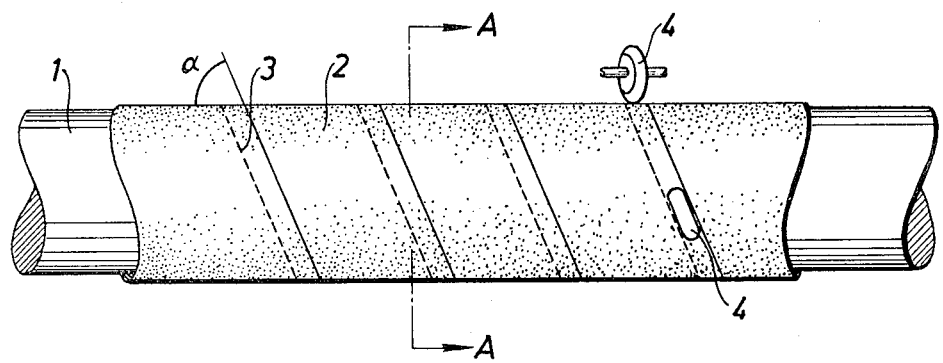
FIG. 1 is a schematic view of a web wound onto a mandrel and a sealed along the overlapping regions of the web.

With reference to FIG. 1, a strip 2 is wound onto a mandrel 1 at the same time as the mandrel is rotated. The strip 2, which comprises a layer of a polyester oriented in longitudinal direction of the strip, is wound with a winding angle $\alpha$, which should be about 60° in order to give optimum utilization of the tensile strength in the polyester material. If the winding angle $\alpha$ is 60°, a covering winding of the mandrel is obtained if the width of the strip is approx. 0.85 times the mandrel diameter. Since an overlap zone 3 is desirable, the width of the strip must be greater than 0.85 times the diameter at an angle $\alpha = 60°$, and in most cases a suitable overlap is obtained if the width of the strip approximately coincides with or slightly exceeds the mandrel diameter. The width of the overlap zone 3 must be chosen bearing in mind the pressure for which the container is to be dimensioned as well as bearing in mind the sealing strength of the joint.

For the sealing of the strip material along its edge zones in the overlap region 3, sealing elements 4 are used. The sealing elements 4 may be stationary and are placed in relation to one another such that they will follow the spiral overlapping zone 3 when the tube 8 formed is advanced on the mandrel 1. Thus in the manufacture of the tube 8 the latter is not firmly attached to the mandrel 1 but moves along the same. The spirally wound overlap zone 3 will then move past the stationary sealing elements 4 which seal the overlapping parts of the web 2 in the overlap zone 3 to one another along a continuous sealing joint. The sealing may be done by means of ultrasound, which is transmitted with the help of one or more stationary elements 4, or as a conventional heat sealing, where heat is similarly supplied to the sealing zone with simultaneous compression, exerted by the sealing elements 4. In this case, the elements 4 may be constituted of wheels or rolls.

Figure 3:
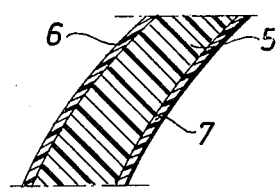
FIG. 3 is an enlarged partial cross-sectional view of the web-shaped laminate material from which the strip is manufactured.

Since it has been found difficult to heat-seal orientation-stretched polyester when the material after stretching acquires a substantially crystalline structure, it is appropriate to coat the oriented polyester material 5, as shown in FIG. 3, with thinner layers 6, 7 of a sealable material, e.g. polyethylene. In certain cases the polyethylene material does not give a sufficient sealing strength or the overlap joint the material requires is too wide. In such cases the coating material in the layers 6, 7 may be constituted instead of a modified polyester which is marketed under the trade name PETG. This polyester, which is a so-called glycol-modified polyester, does not have the same high tensile strength as oriented polyester material, but the material nevertheless has a tensile strength which considerably exceeds that of polyethylene material. The PETG material has the advantage that it can be coated onto polyester with very good adhesion. Also, during stretching, the PETG material is not oriented, but retains a substantially amorphous structure, which means that the material can be sealed with the help of heat.

Figure 2:
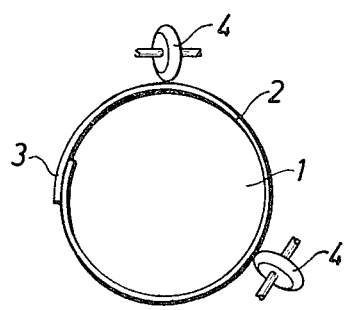
FIG. 2 is a view along a section A—A of FIG. 1.
Figure 4:
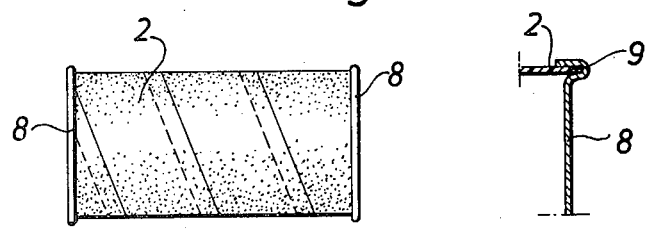
FIG. 4 is a schematic view of a packing container whose container body is made by spiral winding.

The sleeve 2 thus formed, shown in cross-section in FIG. 2, is cut up into appropriate lengths by means of cutting wheels in conventional manner. The spirally wound container body can be provided [as shown in FIG. 4,] with end walls 8 which have on their outer edge a U-shaped groove fitting into the end opening of the sleeve. The end walls 8 are preferably made of polyester material and heat-sealed to the spirally wound container body along the U-shaped groove 9 of the end wall 8. It is also possible, however, to use instead of plastic material metal end walls 8 which can be folded onto the spirally wound container body in a manner known in itself. The end walls 8 may be provided with opening directions of the tear-up type, or else with an emptying hole which is closed by a covering wafer. If the end walls 8 are made of plastic material the end walls are preferably given a dished shape so that they can better absorb the tensile stresses in the material without being deformed in any appreciable degree.

It has been found that a container of the type described above can replace the metal tins which are used at present for the packaging of beer and other carbonated beverages. Further, by utilizing the great tensile strength of oriented polyester material by spiral winding, a substantially uniformly strong container body can be dimensioned, which is not the case in e.g. metal tins where the stresses in the tangential direction are twice as great as the stress in the longitudinal direction of the tin, whilst the material has equally great tensile strength in both directions. Through the spiral winding optimum use may be made of the great tensile strength in the longitudinal direction of the strip and thus a container body can be manufactured which has greater tensile strength in the tangential direction than in the longitudinal direction. In this way, the tensile strength in the container body adapts to the stresses arising when the container body is used as a storage container for beer and other carbonated beverages.

A packing container in accordance with the invention has several advantages beside the purely economical ones. For example, the container will be appreciably lighter than an ordinary metal tin, and the container can be made as clear as glass if desired, so that the contents can be observed. Moreover, polyester material is superior to metal tins from an environmental point of view, since the polyester material can readily be incinerated and this incineration can take place without any toxic gases being formed.

The description given here is intended only to give an example of the invention and it is possible within the scope of the concept of the invention to modify the manufacture of the package by using e.g. several layers of polyester strip, although such a procedure would bring about increased costs and is in principle unnecessary. It is also possible, e.g. to use for the winding of the casing a movable mandrel, onto which the strip is applied without the sleeve formed being made to slide along the surface of the mandrel. In such a case the mandrel must be made movable and the manufacture of the sleeve will take place in steps.

The principles, preferred embodiment and mode of operation of the present invention have been described in the foregoing specification. However, the invention which is intended to be protected is not to be construed as limited to the particular embodiment disclosed. The embodiment is to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

We claim:

1. A method for the manufacture of packing containers from a striplike film, comprising the steps of coating a polyester strip which is monoaxially molecular-oriented in the strip direction with a layer of a non-molecular-oriented amorphous polyester material, spirally winding the coated polyester strip onto a mandrel to form a tube, overlapping edge zones of successive turns of the strip during winding with the width of the said overlapped zones constituting at the most 15% of the width of said strip, sealing the edge zones together in a continuous joint by applying heat to the edge zones for melting and fusing together of the non-molecular-oriented polyester coating, the width of said strip being 75–150% of the diameter of the tube.

2. The method in accordance with claim 1, wherein the overlapped edge zones of the strip are sealed by ultrasonic sealing.

3. The method in accordance with claim 1, wherein the overlapped edge zones are sealed by a plurality of stationary sealing elements arranged in relation to one another such that said sealing elements are located close to said overlapped zones which are advanced continuously past the sealing elements.

4. The method in accordance with claim 1, further comprising the step of cutting the tube formed into sleeve-like container bodies of a desired length.

5. The method in accordance with claim 4, further comprising the steps of covering the openings of the sleeve-like bodies with end walls, and joining said end walls to said bodies along edge zones of the bodies.

6. The method in accordance with claim 5, wherein at least one of said end walls has a dished shape.

7. The method in accordance with claim 5, wherein one of said end walls has an emptying opening adapted to be closed by a covering wafer or cap.

8. The method in accordance with claim 5, further comprising the steps of providing said end walls with a short tubular flange which is adapted to fit onto the end opening of the one body so that surface contact is made between the outside of said flange and the inside of the body opening, and joining said tubular flange and the end opening of the body together by an adhesive or by surface fusion after application of heat.

9. The method in accordance with claim 5, wherein said end walls are made of polyester material.

* * * * *